US006338892B1

(12) United States Patent
McCue et al.

(10) Patent No.: US 6,338,892 B1
(45) Date of Patent: Jan. 15, 2002

(54) IMAGEABLE BACKLIT COMPOSITE STRUCTURE

(75) Inventors: John P. McCue, Holyoke; Richard S. Himmelwright, Wilbraham, both of MA (US)

(73) Assignee: Rexam Graphics, South Hadley, MA (US)

( * ) Notice: Subject to any disclaimer, the term of this patent is extended or adjusted under 35 U.S.C. 154(b) by 0 days.

(21) Appl. No.: 09/418,153

(22) Filed: Oct. 13, 1999

Related U.S. Application Data

(60) Provisional application No. 60/103,972, filed on Oct. 13, 1998.

(51) Int. Cl.[7] ............................ B32B 27/14; B32B 3/00

(52) U.S. Cl. ....................... 428/195; 428/195; 428/212; 428/213; 428/690; 428/913

(58) Field of Search ................................ 428/195, 212, 428/213, 690, 913

(56) References Cited

U.S. PATENT DOCUMENTS

| | | | | | |
|---|---|---|---|---|---|
| 5,759,727 | A | | 6/1998 | Malhotra | |
| 5,759,734 | A | * | 6/1998 | Malhotra | 430/124 |
| 5,965,242 | A | | 10/1999 | Patton et al. | |
| 6,013,982 | A | * | 1/2000 | Thompson et al. | 313/506 |
| 6,071,855 | A | * | 6/2000 | Patton et al. | 503/227 |

OTHER PUBLICATIONS

Internaitonal Search Report issued in International Application No. PCT/US99/23613.

* cited by examiner

*Primary Examiner*—Bruce H. Hess
*Assistant Examiner*—B. Shewareged
(74) *Attorney, Agent, or Firm*—Burns, Doane, Swecker & Mathis, L.L.P.

(57) ABSTRACT

The present invention provide a composite structure comprising an image receiving layer having an image disposed thereon and a light emitting layer, wherein said light emitting layer comprises a phosphorescent or fluorescent material capable of illuminating said image.

12 Claims, No Drawings

IMAGEABLE BACKLIT COMPOSITE STRUCTURE

RELATED APPLICATIONS

This application claims benefit of priority to U.S. Provisional Application No. 60/103,972, filed on Oct. 13, 1998, which is incorporated herein by reference in its entirety.

BACKGROUND OF THE INVENTION

1. Field of the Invention

The present invention relates to composite structures useful in backlit displays, and in particular in outdoor, weather resistant backlit displays.

2. Description of the Related Art

Backlit displays have been used in commercial settings and are routinely used for promotional purposes in retail settings. The typical backlighted display device projects light from an enclosed light source out through a graphic display media towards the viewer, thereby enhancing the visual effect (especially in low light situations) during evening hours.

Backlit displays have not achieved widespread utilization in outdoor and self-contained display devices despite the obvious market depth as demonstrated by the importance of image communication available through billboard advertising and the like. The popularity of conventional billboard advertising employing external light and weather proof materials indicates a cause for low interest in outdoor backlit display systems. Conventional backlit display systems employ cumbersome lighting systems which necessitate large equipment which is not weather proof and therefore can only be utilized in large indoor spaces such as airport halls. U.S. Pat. No. 5,943,801 discusses such backlit displays.

There remains a need for backlit displays which can withstand outdoor weather conditions. In general, backlit displays having more simplified light emitting systems are particularly desirable.

SUMMARY AND OBJECTS OF THE INVENTION

In a first aspect, the present invention provides a composite structure comprising an image receiving layer and a light emitting layer. The light emitting layer comprises a phosphorescent or fluorescent material capable of illuminating an image deposited on the image receiving layer. The phosphorescent or fluorescent material is capable of storing energy from an external source and releasing the stored energy in the form of light capable of illuminating the image. The external source is preferably natural or artificial light to be captured and stored by the phosphorescent or fluorescent material.

Preferably, the composite structure of the invention also comprises a support layer having opposite first and second faces. The image receiving layer is disposed on the first face and the light emitting layer is disposed on the second face. The support layer is preferably transparent.

The composite structures of the invention include structures formed by light emitting layers and image receiving layers which are weather resistant, which allows outdoor image illumination under wet weather conditions. The composite structures according to the invention preferably have a thickness of from about 100 $\mu$M to about 1000 $\mu$M.

In another aspect, the invention provides a method of illuminating an image comprising forming a composite structure comprising an image receiving layer having an image thereon and a light emitting layer comprising a phosphorescent or fluorescent material. The method includes the steps of storing energy in the phosphorescent or fluorescent material and illuminating the image by releasing the stored energy in the form of light emitted by the phosphorescent or fluorescent material.

In yet another aspect, the invention provides a method of forming a self-illuminating backlit display comprising disposing an image receiving layer having an image thereon on a first face of a support layer and forming a light emitting layer on a second face of the support layer. The light emitting layer comprises a phosphorescent or fluorescent material capable of illuminating the image.

In still another aspect, the invention provides a composite structure comprising an image receiving layer having an image disposed thereon, a transparent first conductive layer providing a first electrode, a second conductive layer providing a second electrode and a light emitting layer disposed between the first and second electrodes. The light emitting layer is capable of emitting light when an electrical voltage is applied across the first and second electrodes. The electrical voltage is formed by connecting the first and second electrodes to a voltage source.

In still another aspect, the invention provides a method of illuminating an image comprising forming a composite structure comprised of an image receiving layer having an image thereon; supplying an electrical current to the composite structure; and illuminating the image by converting at least part of the electrical current into light emitted by a light emitting layer of the composite structure.

DETAILED DESCRIPTION OF THE PREFERRED EMBODIMENTS

The present invention relates to composite structures useful in backlit displays, and particularly in outdoor weather resistant backlit displays. The composite structures of the invention provide significantly simplified and therefore highly practical backlit displays.

Compared to conventional backlit displays, the present invention provides composition structures which form backlit displays having greater flexibility, efficiency in space and energy use as well as high durability. These advantages are provided by the combination of a (front) image receiving layer having an image thereon and a backside layer which emits light that illuminates the image on the image receiving layer. The backside of the structure contains a layer or layers that are capable of providing a source of light such that the image layer will be illuminated to an acceptable level. This backside can be composed of fluorescent, phosphorescent or electroluminescent materials.

In one embodiment, the invention provides an imageable backlit composite structure having a front surface or image receiving layer that can be imaged by ink jet imaging, electrographic imaging or any other direct or transfer imaging technology. Preferably, the imaged layer is water resistant such that the backlit composite structure can be employed in outdoor displays while minimizing the detrimental effects of weather conditions to which the display may be subjected.

The image receiving layer can be an ink jet imageable layer or a surface that is designed to accept transfer imaging. Transfer imaging technologies such as ink jet image transfer, electrographic image transfer and other techniques known in the art can be easily adapted for generating an image on the image receiving layer of the invention.

An example of image receiving layers suitable for forming the composite structures of the invention are described in U.S. Pat. No. 5,853,899, the contents of which are incorporated herein by reference in their entirety. Such layers generally include a substrate having an ink receiving layer provided thereon. The preferred substrates are transparent. One preferred ink receiving layer is comprised of a blend of ethylene vinyl acetate copolymer and hydrolyzed polyvinyl alcohol. Preferably, the ink receiving layer contains a solid particulate such as silica or calcium silicate.

The image receiving layer is preferably imaged by color ink jet printing. The ink is allowed to dry prior to utilization of the imaged layer in outdoor backlit panel display. Imaging an image receiving layer for the composite structures of the invention is advantageously performed through an ink jet printing process described in U.S. Pat. No. 5,837,375, the contents of which are incorporated herein by reference in their entirety. Optionally, the image receiving layer is supported by a transparent or semi-transparent film or paper substrate as is known in the industry.

The image receiving layer whether imaged or not yet imaged is combined with a self-contained light emitting layer to form a composite structure according to the invention. By self-contained light emitting layer it is intended a light emitting layer capable of releasing internal energy, for example energy stored within the light emitting layer by exposure to an external source of light or other form of energy, sufficient to illuminate an image without the need for another source of light or other form of energy. The emitted light or afterglow illuminates an image disposed on the image receiving layer for a given period of time after exposure to the external source of light or other form of energy.

Materials suitable for forming a light emitting layer according to the invention include phosphorescent and fluorescent materials capable of releasing internal energy (i.e., energy stored therein) in the form of light which is emitted when the through an afterglow. Preferred materials include pigments which provide long afterglow, for example in the order of 1000 hours with marginal loss of afterglow intensity. These pigments should be easy to incorporate into relatively thin substrates, such as thin polymeric or foil substrates.

The light emitting layer and the image receiving layer, preferably having an image thereon, are arranged such that the light emitted by the light emitting layer illuminates the image in the image receiving layer to form a backlit display.

When employing a fluorescent or phosphorescent based structure, the light energy is provided to the phosphorescent or fluorescent material, for example by artificial or natural light. The energy is stored in the fluorescent or phosphorescent materials and emitted over time to generate the backlit light.

A schematic illustration of phosphorescence based composite structures of the invention is as follows:

| |
|---|
| Image Receiving Layer |
| Transparent Support |
| Phosphorescent Light Emitting Layer |

In another embodiment, the invention provides an electroluminescent light emitting layer. The electroluminescent layer converts electrical power into emitted light capable of illuminating an image disposed on an image receiving layer.

When employing an electroluminescence based light emitting layer, an external power source is employed to generate light using either inorganic or organic light emitting materials. The preferred electroluminescent systems include light sources similar to those used in "Indiglo" wristwatch illumination. As well, devices based on light emitting diodes can be easily adapted in forming electroluminescent light emitting layers to be employed in the present invention. Other suitable power sources could also be used.

In one embodiment, the electroluminescent light emitting layer contains light emitting material. The light emitting material is disposed between first and second electrode layers. A voltage is produced between the electrodes and across the light emitting material. The formation of a voltage between the electrode layers across the light emitting materials results in light emission by the light emitting material. The voltage is produced by connecting the electrodes to an external electrical source. In outdoor applications, the electrical energy necessary for producing a voltage between the electrodes can be provided by a battery.

The electroluminescent composition structures according to the invention advantageously include additional layers which enhance image illumination. Examples of optional image enhancing layers include adhesion promoting layers and light diffusion layers. As well, the mechanical properties of an electroluminescence based composite structure according to the invention are advantageously enhanced by disposing a support layer between the electroluminescent light emitting layer and the image receiving or image containing layer.

A schematic illustration of electroluminescence based composite structures of the invention is as follows:

| |
|---|
| Image Receiving Layer |
| Adhesion Promoting Layer/Light Diffusing Layer |
| Transparent Support |
| Transparent Conductive Layer |
| Inorganic or Organic Light Emitting Layer |
| Aluminum Foil Electrode |

By providing a light emitting layer based on phosphorescent, fluorescent or electroluminescent materials, the invention avoids the need for heavy equipment generally associated with conventional backlit displays. This in turn allows the displays of the invention to be more easily portable. As well, the composition structures of the invention provide aesthetic, functional and space efficient backlit displays. The backlit structures of the present invention provide a sleek thin design that at most would only require a power cord or battery pack to operate.

The composite structures of the invention are suitable for several applications. Particularly advantageous applications include using the composite structures of the invention in airport backlit displays, point of purchase displays, kiosk displays, etc. The composite structures of the invention are also suitable for use in signage and fleet graphics, given the thin and in some cases flexible nature of the design.

One particular application is based on converting images which are disposed on the outside of vehicles, such as buses and tractor, into backlit displays which are illuminated at night time by phosphorescence or electroluminescence based light emitting layers as described herein. Electroluminescent layers are particularly advantageous for this type of application as a source of electrical power can be provided by the vehicle itself, through the vehicle's battery or alternator.

EXAMPLES

The following examples illustrate the formation of composite structures according to the invention.

A. Glow-in-the-dark Self Lit Composite Structure

In this example a composite structure according to the invention including a phosphorescence based light emitting layer is produced.

LumiNova was used as the phosphorescence material. LumiNova is based on strontium oxide aluminate pigment rather than conventional zinc sulfide phosphorescent pigment. LumiNova has excellent light fastness over the conventional zinc sulfide. On a sunny day, the relative afterglow (%) after 10 h exposure for LumiNova is 98% while ZnS is 86%. For a duration of cloudy or rainy climate, the relative afterglow (%) even after 1000 h exposure for LumiNova still remains 97% while ZnS is only 35% after 100 h exposure and dies down to 0% after 300 h exposure.

Onto one side of an approximately 3–5 mil PET (polyester) base with solvent-borne subbing layers was coated an approximately 1 mil Rexam ink-jet receiving layer, while the other side was coated with approximately a 1 mil LumiNova layer. The LumiNova ink was prepared by stirring LumiNova 300F trade name for LumiNova (10 g) into a flexible acrylic resin (AC209-4; DockResins).

B. Electroluminescent Composite Structure

In this example, electroluminescence based backlit display composite structures according to the invention were prepared.

In a first process, using a adhesion inks, a composite structure is made by layer to layer coating and drying of Ag/electrode, dielectric (BaTiO3), Phosphor (ZnS/Cu), ITO ink and Ag/bus bar in sequence onto a PET transparent base.

In a second process, a composite structuris made by laminating phosphor/ITO/PET and dielectric/aluminum foil. The phosphor/ITO/PET was obtained by coating phosphor pigment (e.g., Cu/ZnS; Sylvania Electric Products; see U.S. Pat. No. 4,020,389) onto a transparent electrode (ITO/PET) (OC product such as OC-100, OC-200 and OC-300; ; CP Films). The dielectric/aluminum foil was obtained by coating BaTiO3 (GE BaTi Suspension 117-3-7; U.S. Pat. No. 4,593,228).

An ink-jet medium is laminated onto the structure described above. To assure better transfer quality, the PET of the ITO/PET was subbed with solvent borne layer for easy adhesion on lamination. The structure was further laminated with RexCoat as a protective.

While the invention has been described in terms of preferred embodiments, the skilled artisan will appreciate that various modifications, substitutions, omissions and changes may be made without departing from the spirit thereof. Accordingly, it is intended that the scope of the present invention be limited solely by the scope of the following claims, including equivalents thereof.

What is claimed is:

1. A composite structure comprising an image receiving layer having an image disposed on a face thereof and a light emitting layer disposed on the side of the image layer opposite that of the image, wherein said light emitting layer comprises a phosphorescent or fluorescent material capable of illuminating said image, and with said phosphorescent or fluorescent material being capable of storing energy from an external source and releasing said energy in the form of light capable of illuminating said image.

2. The composite structure of claim 1, wherein said external source emits natural or artificial light which is captured and stored by said phosphorescent or fluorescent material.

3. The composite structure of claim 1, further comprising a support layer having a first face and a second face, wherein said first face is opposite said second face and wherein said image receiving layer is disposed on said first face and said light emitting layer is disposed on said second face, and with the image on the image receiving layer being disposed on the face of the image receiving layer opposite that disposed on the support layer.

4. The composite structure of claim 3, wherein said image receiving layer or said light emitting layer is a coating layer adhered to said first face or said second face of said support layer.

5. The composite structure of claim 1, wherein said light emitting layer and said image receiving layer are weather resistant such that said image can be illuminated outdoors under wet weather conditions.

6. The composite structure of claim 1 having a thickness of from about 100 $\mu$M to about 1000 $\mu$M.

7. A composite structure comprising an image receiving layer having an image disposed on a face thereof, a transparent first conductive layer providing a first electrode and with the first conductive layer being disposed on the side of the image layer opposite that of the image, a second conductive layer providing a second electrode; and light emitting layers disposed between said first and second electrodes; wherein said light emitting layers are capable of emitting light when an electrical voltage is applied across said first and second electrodes.

8. The composite structure of claim 7, wherein said voltage current is formed by connecting said first and second electrodes to a portable power source or a battery.

9. The composite structure of claim 7, further comprising a support layer disposed between said image receiving layer and said first conductive layer, with the image on the image receiving layer being disposed on the face of the image receiving layer opposite that disposed on the support.

10. The composite structure of claim 7, further comprising an adhesion promoting layer or a light diffusing layer disposed between said first conductive layer and said image receiving layer.

11. The composite structure of claim 7, wherein said light emitting layer and said image receiving layer are weather resistant such that said image can be illuminated outdoors under wet weather conditions.

12. The composite structure of claim 7 having a thickness of from about 100 $\mu$M to about 1000 $\mu$M.

* * * * *